(No Model.)
J. N. HOAGLAND, H. L. CUMMING & F. G. TALLMAN.
PLOW.
No. 245,824. Patented Aug. 16, 1881.
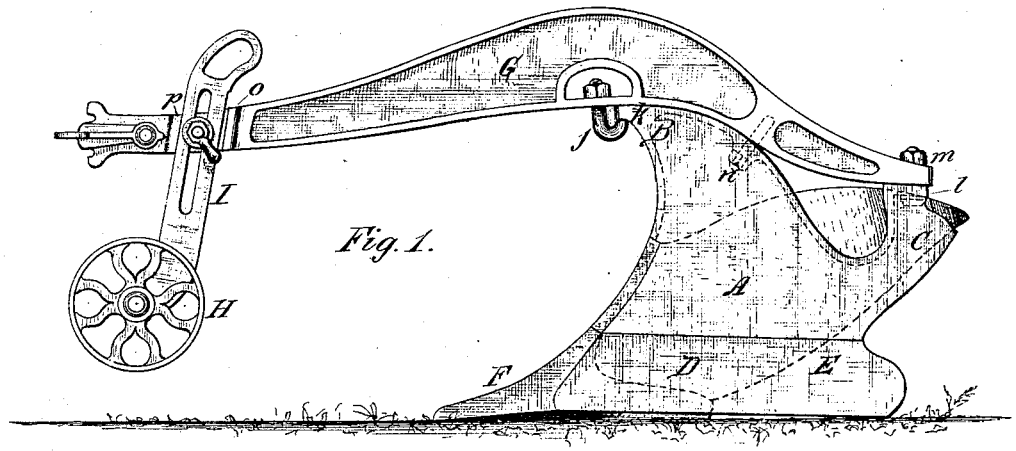
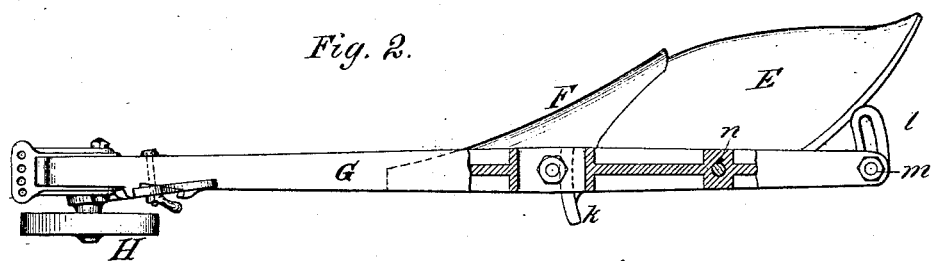
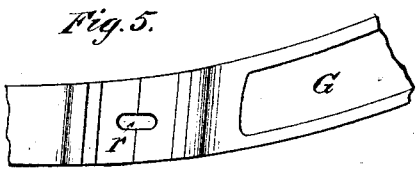
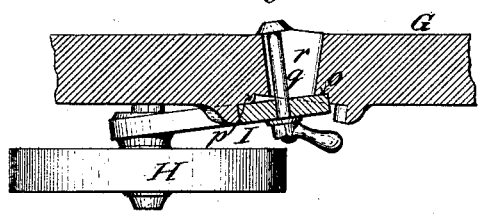
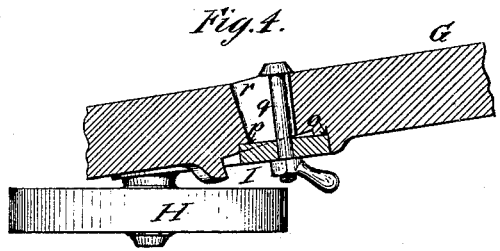

UNITED STATES PATENT OFFICE.

JOHN N. HOAGLAND, HENRY L. CUMMING, AND FRANK G. TALLMAN, OF CASTILE, NEW YORK.

PLOW.

SPECIFICATION forming part of Letters Patent No. 245,824, dated August 16, 1881.

Application filed August 6, 1880. (No model.)

*To all whom it may concern:*

Be it known that we, JOHN N. HOAGLAND, HENRY L. CUMMING, and FRANK G. TALLMAN, of Castile, in the county of Wyoming, in the State of New York, have invented new and useful Improvements in Plows, of which the following is a specification, reference being had to the accompanying drawings.

This invention relates to a plow which can be readily adjusted for two or three horses, as circumstances may require.

Heretofore plows have usually been adjusted from two to three horses by releasing the fastenings which secure the beam to the rear and front arms of the standard, and swinging the beam on the front fastening as a fulcrum until the beam stands at the desired angle to the landside, when the rear fastening is again secured. It has been found in practice that a plow which is adjusted for three horses in this manner is not perfectly balanced, but will draw to one side, which tendency has to be counteracted by an extra pressure upon the handles.

The object of our invention is to so construct the plow that it will draw perfectly true or be balanced when adjusted for three horses; and it consists in providing the standard with a pivot between the fastenings which secure the beam to the standard, and upon which the beam turns in adjusting it from two to three horses, whereby the plow is balanced when adjusted for three horses; and in providing the beam, near its front end, with two intersecting recesses or sockets, in one of which the wheel-standard is secured when the plow is adjusted for two horses, and in the other of which the standard is secured when the plow is adjusted for three horses, as will be hereinafter fully set forth.

In the accompanying drawings, Figure 1 is a side elevation of a plow provided with our improvements. Fig. 2 is a top-plan view thereof, partly in section. Fig. 3 is a horizontal section of the front portion of the beam, with the beam and wheel adjusted for two horses. Fig. 4 is a similar view, with the wheel and beam adjusted for three horses. Fig. 5 is a side elevation of the front portion of the beam with the wheel-standard removed.

Like letters of reference refer to like parts in the several figures.

A represents the standard, provided with a front arm, B, and a rear arm, C. D is the landside, E the mold-board, F the point, G the beam, H the wheel, and I the wheel-standard, all of any well-known and suitable construction.

$j$ is a hook-bolt, by which the beam G is secured to the front arm, B, of the standard, which latter is provided with a projecting arc-shaped rib, $k$, under which the hook-bolt $j$ engages.

$l$ is an arc-shaped horizontal slot formed in the upper end of the rear arm, C, of the standard; and $m$ is a screw-bolt secured to the rear end of the beam, and projecting through the slot $l$, and provided at its upper end with a screw-nut.

$n$ represents the fulcrum pin or bolt, which is secured to the standard A about midway between the front and rear fastenings, $j$ and $m$. The fulcrum $n$ may be constructed in the form of a projecting stud or pin, as shown, or it may be a screw-bolt which passes entirely through the beam, as may be preferred.

When the beam is arranged in the position shown in Fig. 2 it is adjusted for two horses. In order to adjust the plow for three horses the nuts of the hook-bolt $j$ and screw-bolt $m$ are loosened, and the beam is swung on the fulcrum $n$ to the opposite end of the slot $l$, the hook-bolt $j$ sweeping at the same time over the rib $k$. The nuts of the two bolts $j$ and $m$ are then again tightened, when the plow is ready for use with three horses.

$o$ and $p$ are two shallow sockets or recesses arranged in the side of the beam G, near its front end, for the reception of the wheel-standard I. The two recesses $o$ and $p$ intersect, as clearly shown, whereby the standard I is enabled to be secured to the beam at about the same distance from the point F whether it is adjusted for two or three horses. The recess $o$ is arranged to receive the standard I when the beam is adjusted for two horses, as shown in Figs. 2 and 3, and the recess $p$ is arranged to receive the standard when the beam is adjusted for three horses, as shown in Fig. 4. The two recesses $o$ and $p$ are arranged at such an angle with each other that the wheel will remain parallel with the line of draft and the land-side when it is adjusted from two to three horses, as clearly shown, thereby guiding the plow in the proper direction in either position.

q represents the screw-bolt by which the wheel-standard I is secured to the beam; and r is an elongated hole, which is formed in the beam for the reception of the bolt q in its different positions.

Instead of a hook-bolt and curved rib at the front end of the standard, and the slot and bolt at the rear end of the standard, any other suitable adjustable fastening may be employed. For instance, holes may be formed in the arms of the standard at the extreme positions of the beam, and the latter may be secured by removable bolts.

The adjusting devices of our improved plow are very simple in construction and mode of operation, and can be handled by any person of ordinary skill, thereby enabling the person using the plow to adjust the same readily from two to three horses, or vice versa, with certainty.

We do not desire to claim in this patent any invention other than that which is specifically set forth in the claims, and reserve the right to claim all other patentable matter herein shown or described in a separate application.

We are aware that plow-beams have been attached to the standard by means of a pivot-bolt, and this we do not broadly claim; but

We claim as our invention—

1. In a plow, the combination, with the standard A, having a front arm, B, and a rear arm, C, of a beam, G, secured adjustably to both arms of the standard by fastening devices j m, a pivot-bolt, n, connecting the standard and beam between the front and rear fastenings, j m, and two intersecting sockets, o p, formed in the beam G, near its front end, for the reception of the wheel-standard, whereby the plow is readily adjusted for two or three horses, substantially as set forth.

2. The combination of the wheel-standard I and the beam G, provided with the double-inclined notches o and p, substantially as shown and described.

J. N. HOAGLAND.
HENRY L. CUMMING.
FRANK G. TALLMAN.

Witnesses:
CHAS. H. EVERINGHAM,
PORTER JOHNSON.